(12) United States Patent
Tremaine

(10) Patent No.: US 6,179,555 B1
(45) Date of Patent: Jan. 30, 2001

(54) SEALING OF T.O.B.I FEED PLENUM

(75) Inventor: Eric Tremaine, Longueuil (CA)

(73) Assignee: Pratt & Whitney Canada Corp., Longueuil (CA)

( * ) Notice: Under 35 U.S.C. 154(b), the term of this patent shall be extended for 0 days.

(21) Appl. No.: 09/166,954

(22) Filed: Oct. 6, 1998

(51) Int. Cl.[7] .................................................. F01D 5/18
(52) U.S. Cl. ......................... 415/115; 415/190; 415/138; 415/139; 416/95
(58) Field of Search ........................... 415/115, 116, 415/110, 111, 209.2, 209.3, 209.4, 189, 190, 139, 138; 416/95

(56) References Cited

U.S. PATENT DOCUMENTS

| | | | |
|---|---|---|---|
| 3,393,894 | * | 7/1968 | Redsell ................................. 415/115 |
| 3,788,767 | * | 1/1974 | Bednarczyk et al. . | |
| 4,526,511 | * | 7/1985 | Levine .................................. 416/95 |
| 4,756,153 | * | 7/1988 | Roberts et al. ....................... 415/139 |
| 5,597,286 | * | 1/1997 | Dawson et al. ....................... 415/115 |
| 5,772,401 | * | 6/1998 | Canova ............................... 415/209.3 |
| 5,800,124 | * | 9/1998 | Zelesky ................................... 416/95 |

* cited by examiner

*Primary Examiner*—F. Daniel Lopez
*Assistant Examiner*—Richard Woo
(74) *Attorney, Agent, or Firm*—Jeffrey W. Astle

(57) ABSTRACT

The invention provides a novel sealing device and plenum assembly particularly adapted for forming a plenum inwardly of a circumferential stator blade array in a gas turbine engine. A Tangential On Board Injection plenum (T.O.B.I.) is defined by assembly of: a forward plate; a rearward plate; and a segmented inner shroud disposed between the forward and rearward plates. Releasable elongate fasteners are disposed in joints between a series of inner shroud segments with sealing sheaths laterally surrounding the fasteners. While clamping the shroud segments between the forward and rearward plates, the fasteners and sheaths simultaneously seal the joints and secure the inner shroud segments with forward and rearward plates in a rigid structural assembly.

4 Claims, 2 Drawing Sheets

SEALING OF T.O.B.I FEED PLENUM

TECHNICAL FIELD

The invention is directed to a novel sealing device for sealing joints utilizing a cylindrical dowel disposed in semi-cylindrical grooves in the joint surfaces, and specifically applied to sealing a T.O.B.I. (Tangential On Board Injection) feed plenum defined with an inner shroud separated into shroud segments with radially extending joints, the joints being sealed with axially extending dowels and fasteners.

BACKGROUND OF THE ART

Gas turbine engines include several compressed air plenums and ducts for conducting pressurized air for cooling over various engine components. The complexity of manufacturing and assembly of various components represents a significant cost factor in the production and maintenance of aircraft engines. In general, it is preferable to replace multiple parts with single cast or machined parts to reduce the complexity of manufacturing.

The present invention is directed to the manufacture and assembly of a circumferential array of stator blades with outer shroud and inner shroud. The stator array is positioned between the high pressure compressor turbine and the low pressure compressor turbine immediately downstream of the combustor. Between these two turbines is the circumferential array of stator blades which include a radially inwardly directed conduit to conduct cooling air from a plenum surrounding the combustor into the interior of the engine for accumulation in a T.O.B.I. feed plenum. From the T.O.B.I. plenum, cooling air is directed toward the cover plate and body of the low pressure compressor turbine. The T.O.B.I. plenum includes nozzles directed toward the cover plate and turbine to direct cooling air on and through the cover plate and turbine.

Conventional designs of stator arrays generally include multiple components which are assembled together into a ring like structure. Individual stator blades are machined and assembled together into a ring structure during manufacture. In general, if any machined components can be manufactured in a single unit, costs and labour savings result. Recently the capability of accurately machining large metal parts has increased through use of computer-aided manufacturing and computer numerical controlled machining. CAD and CNC enable designers to combine extremely complex components together into a single part. The complex geometry of blade shapes and geometry of the hot gas path have in the past resulted in manufacturing procedures which include individually machining each stator blade then brazing the blades together with the outer and inner shrouds to define the hot gas path.

It is desirable to produce a stator blade assembly in a single ring-like unit. For ease of manufacture and maintenance of structural integrity, it is desirable to produce a single ring-like structure utilizing the outer shroud as a continuous hoop member, whereas the blades and attached inner shrouds are split apart. Splitting the inner shroud allows for relieving of internal stresses, facilitates fabrication of the ring structure, facilitates inspection and simplifies maintenance. Fabrication can involve unitary casting of the one-piece outer shroud together with split inner shroud and radial stator blades, or machining individual stator blades then brazing the individual stator blades to form an integral outer shroud and split inner shroud.

The individual stator blades with attached inner shroud segments must be joined together into an inner annular shroud in a manner which maintains the seal of the inner shroud preventing air from escaping from the T.O.B.I. plenum into the hot gas path. Leakage of cooling air would result in a significant decrease in the efficiency of the engine cooling system.

Therefore, it is very desirable to provide a split inner shroud that can be efficiently sealed to prevent migration between the hot gas path and the cooling air within the plenum. It is also highly desirable to produce a plenum from easily assembled and disassembled components that can be inspected, replaced or repaired during routine maintenance.

DISCLOSURE OF THE INVENTION

The invention provides a novel plenum assembly particularly adapted for forming a plenum inwardly of a circumferential stator blade array in a gas turbine engine. Typically, a gas turbine engine has an air compressor, combustor, and an annular hot gas path axially ducting hot gas past a circumferentially spaced apart array of stator blades upstream of a turbine rotor.

Each stator blade has an internal bore for ducting cooling air between a radially outward shroud and a T.O.B.I. plenum (i.e.: Tangential On Board Injection) that accumulates cooling air for expulsion through T.O.B.I. nozzles. The T.O.B.I. plenum is defined by: a forward plate; a rearward plate; and an inner shroud disposed between the forward and rearward plates.

The inventive improvement relates to a novel inner shroud comprising a circumferential assembly of inner shroud segments with radially extending joints between adjacent inner shroud segments. The outer shroud is a one-piece hoop with stator blades and segmented inner shroud. To assemble the inner shroud to contain compressed air in the T.O.B.I. plenum, the plenum enclosure includes releasable elongate fasteners engaging the forward and rearward plates and clamping the inner shroud segments between the plates. Each fastener is disposed axially within an associated joint between adjacent inner shroud segments and each fastener includes a sealing sheath disposed about the fastener for sealing the associated joint.

In broad aspect, the invention provides a sealing device for sealing any joint in a structure between two adjacent joint surfaces. The sealing device being an elongate cylindrical dowel disposed in sealing contact within two opposing generally semi-cylindrical grooves in each adjacent joint surface. Preferably the dowel comprises an outer annular sheath and an inner cylindrical core. Application of the sealing device is advantageous in structures subject to thermal expansion where providing joints allows stress relief. The cylindrical dowels in semi-cylindrical grooves allow for thermally induced movement while retaining an effective seal in the joints. The cylindrical shape can be easily bored during manufacture with commonly available machine tools, and if necessary larger sized bores and dowels can be fitted during maintenance operations if leaks develop.

A preferred sealing device includes an outer annular sheath and an inner core member. The core can be a releasable fastener used in conjunction with plates or other structural components to construct annular rings or hollow plenum structures if desired.

Further details of the invention and its advantages will be apparent from the detailed description and drawings included below.

BRIEF DESCRIPTION OF THE DRAWINGS

In order that the invention may be readily understood, one preferred embodiment of the invention will be described by way of example, with reference to the accompanying drawings wherein.

DETAILED DESCRIPTION OF PREFERRED EMBODIMENTS

Figure 1:
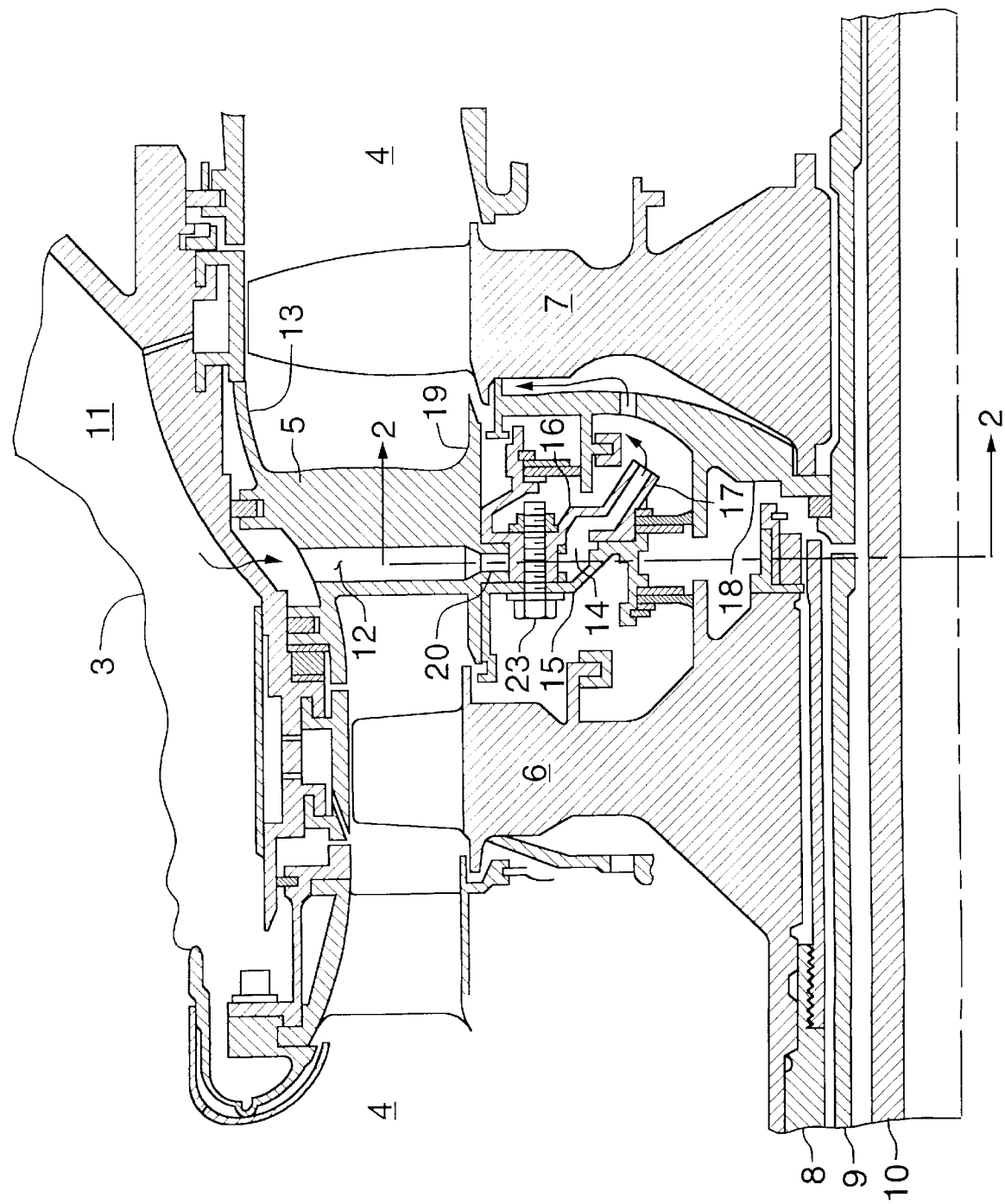
FIG. 1 is an axial sectional view through the turbine section of a gas turbine engine showing a stator and T.O.B.I. plenum with T.O.B.I. nozzles between two turbine rotors.

The detailed construction of a gas turbine engine is considered to be common knowledge to those skilled in the art. It is therefore, not necessary to explain the details herein of a gas turbine engine that includes an air compressor (not shown), combustor 3, and annular hot gas path 4. The hot gas path 4 axially ducts hot gas past a circumferentially spaced apart array of stator blades 5 (left to right as drawn in FIG. 1). The high pressure compressor turbine 6 drives the high pressure shaft 8 and the low pressure compressor turbine 7 drives the low pressure shaft 9. Not shown are the power turbines which drive the power turbine shaft 10.

In a known manner, the cooling compressed air from a plenum 11 adjacent to the combustor 3 is ducted through the hollow stator blades 5 as indicated with arrows in FIG. 1. Each stator blade 5 has an internal bore 12 for ducting cooling air between a radially outward shroud 13 and a T.O.B.I. plenum 14 (Tangential On Board Injection).

Figure 2:
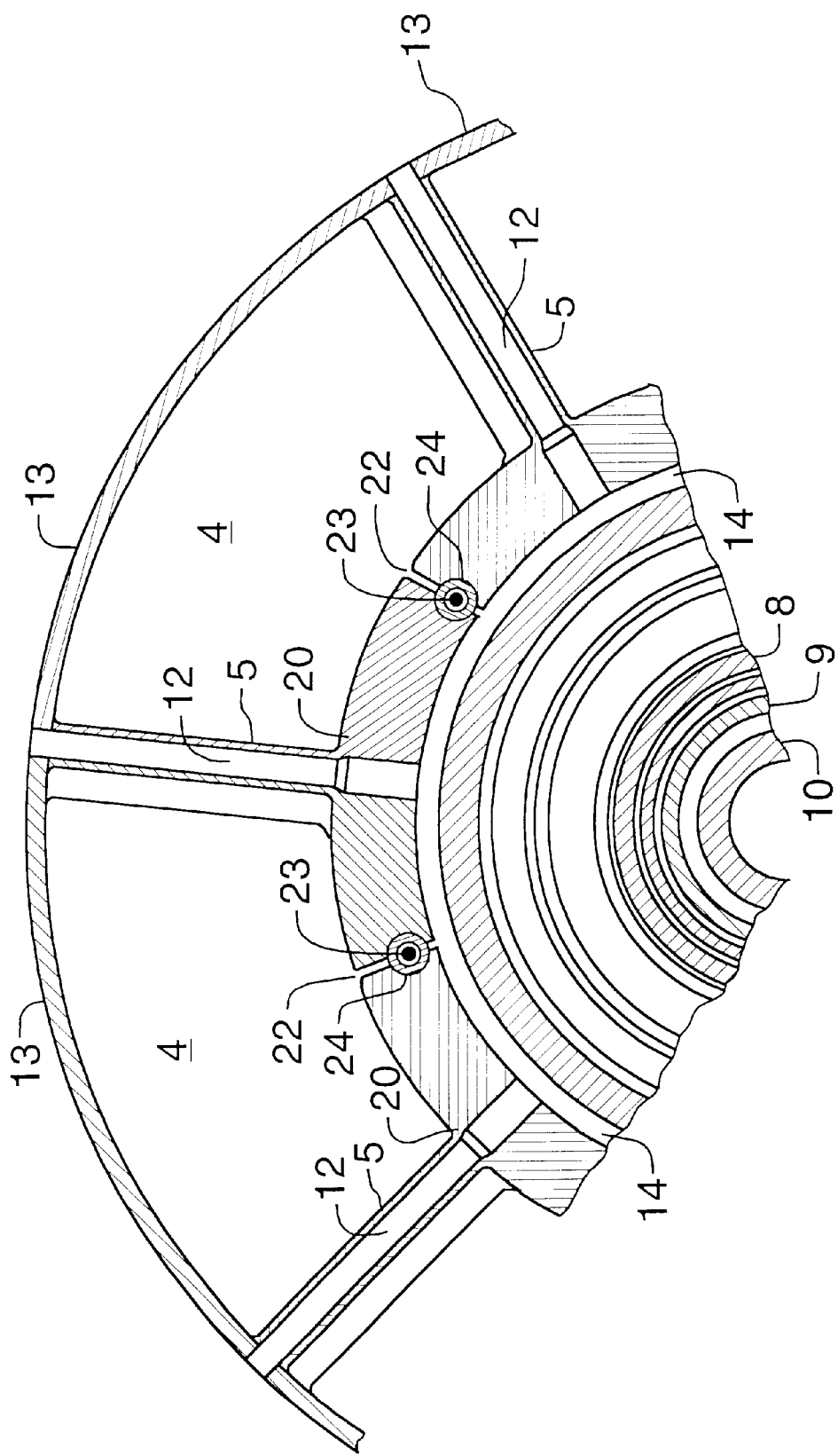
FIG. 2 is a partial transverse cross-sectional view along lines 2—2 of FIG. 1 showing the segmented inner shroud with radial joints sealed by bolt fasteners with sealing sheaths.

In the embodiment illustrated in FIGS. 1 and 2, the T.O.B.I. plenum 14 is defined by a forward plate 15 and a rearward plate 16. The rearward plate 16 includes T.O.B.I. nozzles 17 to direct cooling air flow onto the cover plate 18 and through openings to the low pressure compressor turbine 7 in a known manner.

The present invention can be applied to the assembly and construction of the T.O.B.I. plenum 14 as follows. The inner shroud 19 includes an inward segment 20 best seen in FIG. 2. The inner shroud segments 20 with bore 12 conduct compressed air directly into the T.O.B.I. plenum 14. The segments 20 of the inner shroud 19 are clamped between the forward plate 15 and the rearward plate 16. Joints 22 radially extend between abutting surfaces of adjacent inner shroud segments 20.

Releasable elongate fasteners such as bolts 23 engage the forward and rearward plates 15 and 16, and clamp the inner shroud segments 20 and 21 between the plates 15 and 16. To seal the associated joint 22, each bolt fastener 23 includes a sealing sheath 24 disposed about the shaft of the bolt 23.

Several advantages result from the simple construction of the inner shroud 19 shown. The clamping of the segments 20 between the plates 15 and 16 ensures that chattering of the stator blades 5 and excessive vibration do not occur. The bolts 23 with clamping plates 15 and 16 ensure that the T.O.B.I. plenum 14 remains sealed and presents a rigid structure for ducting cooling air through the T.O.B.I. nozzles 17. The sealing sheaths 24 on the shaft of the bolts 23 to provide air sealed joints 22 in a segmented inner shroud. Manufacturing and maintenance of the stator blades 5 and T.O.B.I. plenum 14 are simplified with this structure in a straightforward cost effective manner.

It will be appreciated that the sealing device described herein can be applied to sealing a joint in any structure between two adjacent joint surfaces. The elongate cylindrical dowel is disposed in sealing contact within two opposing generally semi-cylindrical grooves in each adjacent joint surface. A split ring or segmented annular structure can be constructed with sealed joints to accommodate thermal expansion while retaining its seal. Preferably the dowel has an outer annular sheath and an inner cylindrical core to permit use of suitable materials for outward sealing and for core strength. For example, the core can form a fastener to rivet or bolt plates or other components to the ring structure if desired.

Although the above description and accompanying drawings relate to a specific preferred embodiment as presently contemplated by the inventor, it will be understood that the invention in its broad aspect includes mechanical and functional equivalents of the elements described and illustrated.

The embodiments of the invention in which an exclusive property or privilege is claimed are defined as follows:

1. An annular plenum enclosure comprising:
    a forward plate;
    a rearward plate;
    an inner shroud disposed between the forward and rearward plates, the inner shroud comprising a circumferential assembly of inner shroud segments with radially axially extending joints between adjacent inner shroud segments; and
    a plurality of releasable elongate fasteners engaging the forward and rearward plates, each fastener including sealing sheath means, comprising an annular sheath disposed laterally about the fastener, for engaging an opposing pair of sheath-mating grooves in the associated joint and for sealing said joint, the fastener in tension clamping the inner shroud segments between the forward and rearward plates, and positioning the sheath in sealing engagement with the grooves of the joint.

2. An annular plenum enclosure according to claim 1 wherein the fastener has a solid cylindrical body, the sheath comprises an annular cylinder concentrically slidingly engaging the fastener body, and the grooves are substantially semi-cylindrical.

3. In a gas turbine engine having an air compressor, combustor, and an annular hot gas path axially ducting hot gas past a circumferentially spaced apart array of stator blades upstream of a turbine rotor, each stator blade having an internal bore for ducting cooling air between a radially outward shroud and a T.O.B.I. plenum, the T.O.B.I. plenum defined by: a forward plate; a rearward plate; and an inner shroud disposed between the forward and rearward plates, the improvement comprising:
    said inner shroud comprising a circumferential assembly of inner shroud segments with radially axially extending joints between adjacent inner shroud segments; and
    a plurality of releasable elongate fasteners engaging the forward and rearward plates, each fastener including sealing sheath means, comprising an annular sheath disposed laterally about the fastener, for engaging an opposing pair of sheath-mating grooves in the associated joint and for sealing said joint, the fastener in tension clamping the inner shroud segments between the forward and rearward plates, and positioning the sheath in sealing engagement with the grooves of the joint.

4. A gas turbine engine according to claim 3 wherein the fastener has a solid cylindrical body, the sheath comprises an annular cylinder concentrically slidingly engaging the fastener body, and the grooves are substantially semi-cylindrical.

* * * * *